UNITED STATES PATENT OFFICE.

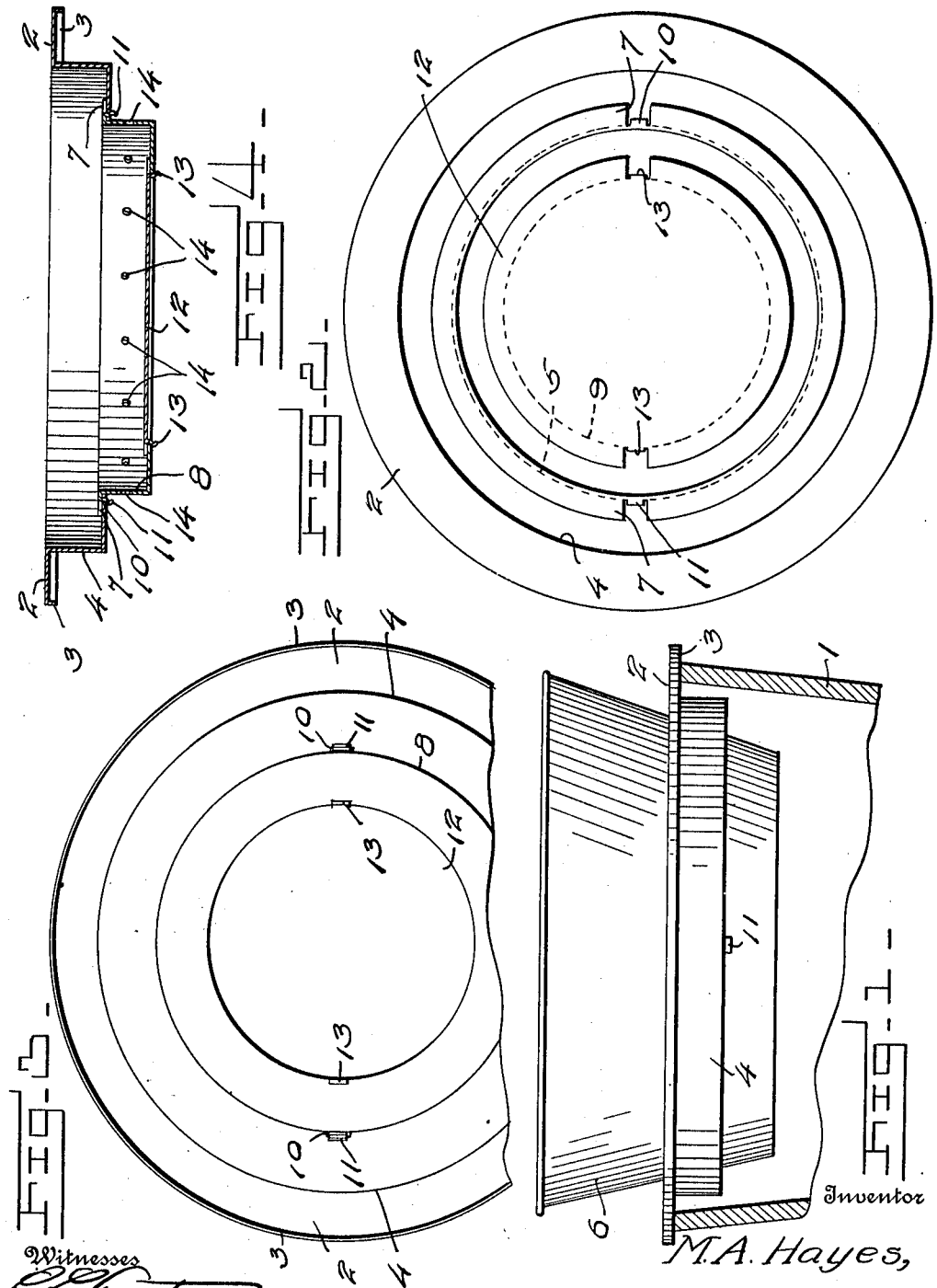

MARY A. HAYES, OF LA CROSSE, WISCONSIN.

COOKING UTENSIL.

1,022,237.  Specification of Letters Patent.  Patented Apr. 2, 1912.

Application filed April 11, 1911. Serial No. 620,363.

*To all whom it may concern:*

Be it known that I, MARY A. HAYES, a citizen of the United States, residing at La Crosse, in the county of La Crosse and State of Wisconsin, have invented certain new and useful Improvements in Cooking Utensils, of which the following is a specification.

My invention relates to improvements in cooking utensils and has for its object the provision of a device for attachment to a kettle or saucepan which will serve to support a second pan thereabove to utilize the steam generated in the lower kettle or saucepan for cooking the contents of the upper pan.

To attain the desired object my invention comprises a cooking utensil substantially as illustrated in the accompanying drawing and as hereinafter described, but it will be understood that I may make any changes in the details of said construction lying within the scope of my claim without departing from the spirit of the invention.

Figure 1 represents a side elevation of my device applied to a pot or saucepan. Fig. 2 represents a top plan view of my complete device. Fig. 3 represents a bottom plan view thereof, and Fig. 4 represents a vertical sectional view.

In the drawings the numeral 1 designates the pot or saucepan on which is mounted my device, said device comprising a ring or disk 2 having a depending peripheral flange 3 adapted to hang over the top of the pot or kettle to prevent said ring from sliding off, the ring having a countersunk central portion 4 having the circular aperture 5 therein. Mounted in the countersunk portion is the pan 6 which is thus supported over the bottom pan, the heat and steam from the lower pan rising through the aperture in my device to heat the bottom of superposed pan 6 and cook the contents thereof. When it is desired to cook an article contained in a smaller pan I mount in the countersunk portion of my ring 2 a second similarly shaped ring 7 having a countersunk portion 8 and the central aperture 9, the countersunk portion 8 fitting in the aperture 5 of the first ring, while said first ring has formed therein the recesses 10 through which project the resilient latch members 11 carried by the second ring for locking the two members together.

It will be understood that an indefinite number of the rings may be employed according to the size of the supporting pot or pans and the size of the other cooking utensil which is to be supported thereon.

In the drawings I have illustrated a plate 12 being solid or without the central aperture to form a complete closure for the bottom of my device and likewise being provided with the resilient latch members 13 for securing it in position, but it will be understood that my set may comprise a greatly increased number of interlocking rings and plates to adapt it to be used upon either a water kettle or upon varying sizes of saucepans.

When it is desired to cook fruit cake or Boston brown bread, and steam the same, I form a plurality of perforations 14 in the counter-sunk portion of the ring 7, and through which steam may pass to the bottom of the pan 6.

From the foregoing description it is evident that I have provided a highly satisfactory attachment for cooking utensils which provides a sectional suspension cooking outfit which will support a second cooking utensil or article to be cooked above the first, whereby I attain a great saving of fuel and am able to cook a plurality of dishes in a satisfactory manner at but slight expense.

I claim:

The combination with a kettle, of a pair of upper and lower rings having countersunk portions, apertures formed in the center of each counter-sunk portion, recesses formed in the counter-sunk portion of each ring adjacent the apertures, resilient latches formed upon the lower ring and adapted to engage the recesses of the counter-sunk portion of the upper ring, a plate for closing the aperture formed in the counter-sunk portion of the lower ring, resilient latches formed upon the plate and adapted to engage the last mentioned recesses, perforations formed in the counter-sunk portion of the lower ring whereby steam from the kettle is permitted to pass to the rings and the bottom of a utensil supported thereby.

In testimony whereof I affix my signature in the presence of two witnesses.

MARY A. HAYES.

Witnesses:
L. KLEEBER,
MARIE A. SIMMERLING.

Copies of this patent may be obtained for five cents each, by addressing the "Commissioner of Patents, Washington, D. C."